US012737652B2

(12) United States Patent
Lee et al.

(10) Patent No.: US 12,737,652 B2
(45) Date of Patent: Sep. 15, 2026

(54) RESOURCE-LIMITED FEDERATED LEARNING USING DYNAMIC MASKING

(71) Applicant: International Business Machines Corporation, Armonk, NY (US)

(72) Inventors: Wei-Han Lee, White Plains, NY (US); Changchang Liu, White Plains, NY (US); Zhongshu Gu, Ridgewood, NJ (US); Mudhakar Srivatsa, White Plains, NY (US)

(73) Assignee: International Business Machines Corporation, Armonk, NY (US)

(*) Notice: Subject to any disclaimer, the term of this patent is extended or adjusted under 35 U.S.C. 154(b) by 940 days.

(21) Appl. No.: 17/659,181

(22) Filed: Apr. 14, 2022

(65) Prior Publication Data

US 2023/0334346 A1 Oct. 19, 2023

(51) Int. Cl.
*G06N 5/04* (2023.01)
*G06N 5/043* (2023.01)
*G06N 20/20* (2019.01)

(52) U.S. Cl.
CPC ............. *G06N 5/043* (2013.01); *G06N 20/20* (2019.01)

(58) Field of Classification Search
None
See application file for complete search history.

(56) References Cited

U.S. PATENT DOCUMENTS 10,998,101 B1 5/2021 Tran
2020/0372380 A1* 11/2020 Liu ......................... G06F 18/23
2021/0073678 A1* 3/2021 Chu ....................... G06N 3/045
2021/0313077 A1 10/2021 Smurro
2021/0383280 A1 12/2021 Shaloudegi
2022/0036194 A1 2/2022 Sundaresan
2022/0044162 A1* 2/2022 Zhang .................... G06N 20/20
(Continued)

FOREIGN PATENT DOCUMENTS

CN 112770291 A 5/2021
CN 113779608 A 12/2021
(Continued)

OTHER PUBLICATIONS

Xu et al ("ELFISH: Resource-Aware Federated Learning on Heterogeneous Edge Devices" Dec. 2019) (Year: 2019).*
(Continued)

*Primary Examiner* — Lut Wong
(74) *Attorney, Agent, or Firm* — Elliot J. Shine

(57) ABSTRACT

A computer-implemented method, a computer program product, and a computer system for resource-limited federated learning using dynamic masking. A server in federated machine learning evaluates resources of respective agents in the federated machine learning to determine capacities of model training by the respective agents. The server masks weights of a full machine learning model to construct a masked machine learning model, based on the capacities. The server distributes the masked machine learning model to the respective agents which train the masked machine learning model. The server receives from the respective agents updated weights obtained through training the masked machine learning model. The server updates the full machine learning model, based on the updated weights.

18 Claims, 5 Drawing Sheets

(56) References Cited

U.S. PATENT DOCUMENTS

2022/0101175 A1* 3/2022 Lee ........................ G06N 3/082

FOREIGN PATENT DOCUMENTS

CN 116911401 A 10/2023
JP 2023-157843 A 10/2023

OTHER PUBLICATIONS

Jiang et al ("Model Pruning Enables Efficient Federated Learning on Edge Devices" Apr. 6, 2022) (Year: 2022).*
Ji et al ("Dynamic Sampling and Selective Masking for Communication-Efficient Federated Learning" Sep. 2021) (Year: 2021).*
Li et al (FedMask: Joint Computation and Communication-Efficient Personalized Federated Learning via Heterogeneous Masking 2021) (Year: 2021).*
Barroso et al., "Dynamic Federated Learning Model for Identifying Adversarial Clients", arXiv:2007.15030v1 [cs.LG] Jul. 29, 2020, 13 pages.
Behera et al., "Federated Learning using Distributed Messaging with Entitlements for Anonymous Computation and Secure Delivery of Model", printed on Mar. 15, 2022, 9 pages.
Disclosed Anonymously, "Method and Apparatus for Standards-Based Real-Time Management and Monitoring of Cluster-Based Machine Learning Models", An IP.com Prior Art Database Technical Disclosure, IP.com No. IPCOM000262300D, IP.com Electronic Publication Date: May 18, 2020, 4 pages.
Disclosed Anonymously, "Method and System for Reducing Communication Cost and Improving Local Model Accuracy in Federated Learning", An IP.com Prior Art Database Technical Disclosure, IP.com No. PCOM000265654D, IP.com Electronic Publication Date: May 4, 2021, 6 pages.
Disclosed Anonymously, "User-Behavior-Guided Dynamic Loaders in Embedded Operating Systems", An IP. com Prior Art Database Technical Disclosure, IP.com No. IPCOM000256405D, IP.com Electronic Publication Date: Nov. 28, 2018, 11 pages.
Ji et al., "Dynamic Sampling and Selective Masking for Communication-Efficient Federated Learning", IEEE Intelligent Systems, @ 2021 IEEE, 9 pages.
Mell et al., "The NIST Definition of Cloud Computing", NIST National Institute of Standards and Technology U.S. Department of Commerce, Special Publication 800-145, Sep. 2011, 7 pages.
Caldas, S. et al., "Expanding the reach of federated learning by reducing client resource requirements." arXiv, Dec. 18, 2018, 12 pages.
Diao et al., HeteroFL: Computation and Communication Efficient Federated Learning for Heterogeneous Clients:, arXiv, Dec. 14, 2021, 24 pages, doi: https://doi.org/10.48550/arXiv.2010.01264.
Japan Patent Office, "Notice of Reasons for Refusal" Jun. 16, 2026, 04 Pages, JP Application No. 2023-020196.
Lifei et al., "Security Issues and Privacy Preserving in Machine Learning", Journal of Computer Research and Development, 2020, 20 pages, vol. 57, No. 10 (English abstract submitted).
Xu et al., "ELFISH: Resource-Aware Federated Learning on Heterogeneous Edge Devices", arXiv, Dec. 2019, 6 pages, doi: 10.48550/arXiv.1912.01684.

* cited by examiner

RESOURCE-LIMITED FEDERATED LEARNING USING DYNAMIC MASKING

This invention was made with Government support under contract W911NF-16-3-0001 awarded by the U.S. Army Research Laboratory and the U.K. Defence Science and Technology Laboratory. The U.S. and U.K. Governments have certain rights to this invention.

BACKGROUND

The present invention relates generally to federated learning, more particularly to resource-limited federated learning using dynamic masking.

Federated learning aims to allocate a complicated learning process onto several agents especially when agents are reluctant to share their local data to a fusion server because concerns about limited communication resources and data privacy issues. However, a machine learning model such as a deep neural network (DNN) may contain hundreds of millions of parameters, making the training and inference on resource-constrained edge devices impossible.

Model pruning techniques have been leveraged to reduce the model size in federated learning, so that all the agents can contribute to the training process. However, previous model pruning works in federated learning are implemented by a fusion server in a centralized manner before the regular federated learning process, which can be generally classified into two categories. (1) The server directly prunes an initial model without using any local data of the agents. (2) The server trains a model based on a collection of local data of the agents and then prunes this pre-trained model. Such a centralized pruning process is independent of the training data, thus reducing the model accuracy. Or, such a centralized pruning process requires collecting local data of the agents, thus harmful to the privacy of local data of the agents and in conflict with the nature of federated learning.

Ji et. al. (Dynamic Sampling and Selective Masking for Communication-Efficient Federated Learning, IEEE Intelligent Systems, 2021) proposes top-k selective masking to consider the importance of model parameters in each local training. Given a static masking rate on the proportion of model parameters as the selective criteria, only model parameters with the largest absolute difference are selected proportionally for federated aggregation and model updating. In Ji's disclosure, the selective masking strategy is static and the same across all agents. Sundaresan et. al. (US Patent Publication 20220036194 A1) discloses a sparse distillation framework for producing a class of parameter and compute efficient artificial intelligence or machine learning models suitable for resource constrained applications. The sparse distillation framework simultaneously distills knowledge from a compute heavy teacher model while also pruning a student model in a single pass of training, thereby reducing training and tuning times considerably. In Sundaresan's disclosure, resource constraints in a federated learning setting are not considered; furthermore, a smaller masked model is not updated by different agents in each round and updated smaller masked models are not combined to train a large model on a server.

SUMMARY

In one aspect, a computer-implemented method for resource-limited federated learning using dynamic masking is provided. The computer-implemented method includes evaluating, by a server in federated machine learning, resources of respective agents in the federated machine learning to determine capacities of model training by the respective agents. The computer-implemented method further includes masking, by the server, weights of a full machine learning model to construct a masked machine learning model, based on the capacities. The computer-implemented method further includes distributing, by the server, the masked machine learning model to the respective agents which train the masked machine learning model. The computer-implemented method further includes receiving, by the server, from the respective agents, updated weights obtained through training the masked machine learning model. The computer-implemented method further includes updating, by the server, the full machine learning model, based on the updated weights.

The computer-implemented method further includes determining, by the server, whether an updated full machine learning model converges. The computer-implemented method further includes, in response to determining that the updated full machine learning model converges, determining, by the server, whether the resources have changed.

In response to determining that the resources have changed, the computer-implemented method further includes re-evaluating, by the server, the resources to determine new capacities of the model training by the respective agents. The computer-implemented method further includes masking, by the server, weights of the updated full machine learning model to construct a new masked machine learning model, based on the new capacities, in a current iteration. The computer-implemented method further includes distributing, by the server, the new masked machine learning model to the respective agents, for training the new masked machine learning model and obtaining new updated weights. The computer-implemented method further includes updating, by the server, a full machine learning model that has been updated in a previous iteration, based on the new updated weights.

In response to determining that the resources have not changed, the computer-implemented method further includes masking, by the server, weights of the updated full machine learning model to construct a new masked machine learning model, based on the capacities, in a current iteration. The computer-implemented method further includes distributing, by the server, the new masked machine learning model to the respective agents, for training the new masked machine learning model and obtaining new updated weights. The computer-implemented method further includes updating, by the server, a full machine learning model that has been updated in a previous iteration, based on new the updated weights.

In another aspect, a computer program product for resource-limited federated learning using dynamic masking is provided. The computer program product comprises a computer readable storage medium having program instructions embodied therewith, and the program instructions are executable by one or more processors. The program instructions are executable to evaluate, by a server in federated machine learning, resources of respective agents in the federated machine learning to determine capacities of model training by the respective agents. The program instructions are further executable to mask, by the server, weights of a full machine learning model to construct a masked machine learning model, based on the capacities. The program instructions are further executable to distribute, by the server, the masked machine learning model to the respective agents which train the masked machine learning model. The program instructions are further executable to receive, by the server, from the respective agents, updated weights obtained through training the masked machine learning model. The program instructions are further executable to update, by the server, the full machine learning model, based on the new updated weights.

In yet another aspect, a computer system for resource-limited federated learning using dynamic masking is provided. The computer system comprises one or more processors, one or more computer readable tangible storage devices, and program instructions stored on at least one of the one or more computer readable tangible storage devices for execution by at least one of the one or more processors. The program instructions are executable to: evaluate, by a server in federated machine learning, resources of respective agents in the federated machine learning to determine capacities of model training by the respective agents; mask, by the server, weights of a full machine learning model to construct a masked machine learning model, based on the capacities; distribute, by the server, the masked machine learning model to the respective agents which train the masked machine learning model; receive, by the server, from the respective agents, updated weights obtained through training the masked machine learning model; and update, by the server, the full machine learning model, based on the updated weights.

For the computer program product and the computer system, the program instructions are further executable to: determine, by the server, whether an updated full machine learning model converges; and in response to determining that the updated full machine learning model converges, determine, by the server, whether the resources have changed.

For the computer program product and the computer system, the program instructions are further executable to: in response to determining that the resources have changed, re-evaluate, by the server, the resources to determine new capacities of the model training by the respective agents; mask, by the server, weights of the updated full machine learning model to construct a new masked machine learning model, based on the new capacities, in a current iteration; distribute, by the server, the new masked machine learning model to the respective agents, for training the new masked machine learning model and obtaining new updated weights; and update, by the server, a full machine learning model that has been updated in a previous iteration, based on the new updated weights.

For the computer program product and the computer system, the program instructions are further executable to: in response to determining that the resources have not changed, mask, by the server, weights of the updated full machine learning model to construct a new masked machine learning model, based on the capacities, in a current iteration; distribute, by the server, the new masked machine learning model to the respective agents, for training the new masked machine learning model and obtaining new updated weights; and update, by the server, a full machine learning model that has been updated in a previous iteration, based on the new updated weights.

The advantages of the computer-implemented method, the computer program products, and the computer system over previous disclosures are as follows. Resource constraints in the federated machine learning is considered by the server, masking weights of the full machine learning model is based on such resource constraints, the masked machine learning model is trained by the respective agents using local training data, the updated weights are obtained by the respective agents, and the full machine learning model is updated based on the updated weights. With the computer-implemented method, the computer program products, and the computer system, the computation and communication cost for respective agents is reduced by using the masked machine learning model, while the overall efficiency and accuracy of the federated machine learning are maintained.

The further advantages of the computer-implemented method, the computer program products, and the computer system over previous disclosures are as follows. Masking weights of the full machine learning model to generate the masked machine learning model is dynamic. The capacities of model training by the respective agents are dynamically monitored and analyzed. In each iteration, a new masked machine learning model is created, based on the capacity of model training by the respective agents; the new masked machine learning model is distributed by the server and trained by the respective agents; the full machine learning model is updated based on updated weights. The iterations are continued until the updated full machine learning model converges.

DETAILED DESCRIPTION

Embodiments of the present invention disclose a system and method of secure model pruning and federated learning for resource-constrained agents using dynamic masking. At each iteration, a binary mask is generated which is of the same size and shape of a full model, and the disclosed system and method determines which of weights are to be transmitted to agents. At each iteration, a masked model is updated collaboratively by all the agents through federated learning.

The key idea of the disclosed system and method is to jointly prune and train for federated learning in an automatic and dynamic manner, so that the data of the resource-constrained agents can be fully utilized without being shared with a fusion server.

The disclosed system and method can achieve both good model accuracy and privacy. The good model accuracy is achieved by fully incorporating local data of the agents. Because of without requiring the sharing of local data of the agents, the privacy in federated machine learning is achieved. In embodiments of the present invention, both good model accuracy and privacy are achieved for resource-constrained agents through updating masked model in each iteration in federated learning.

Figure 1:
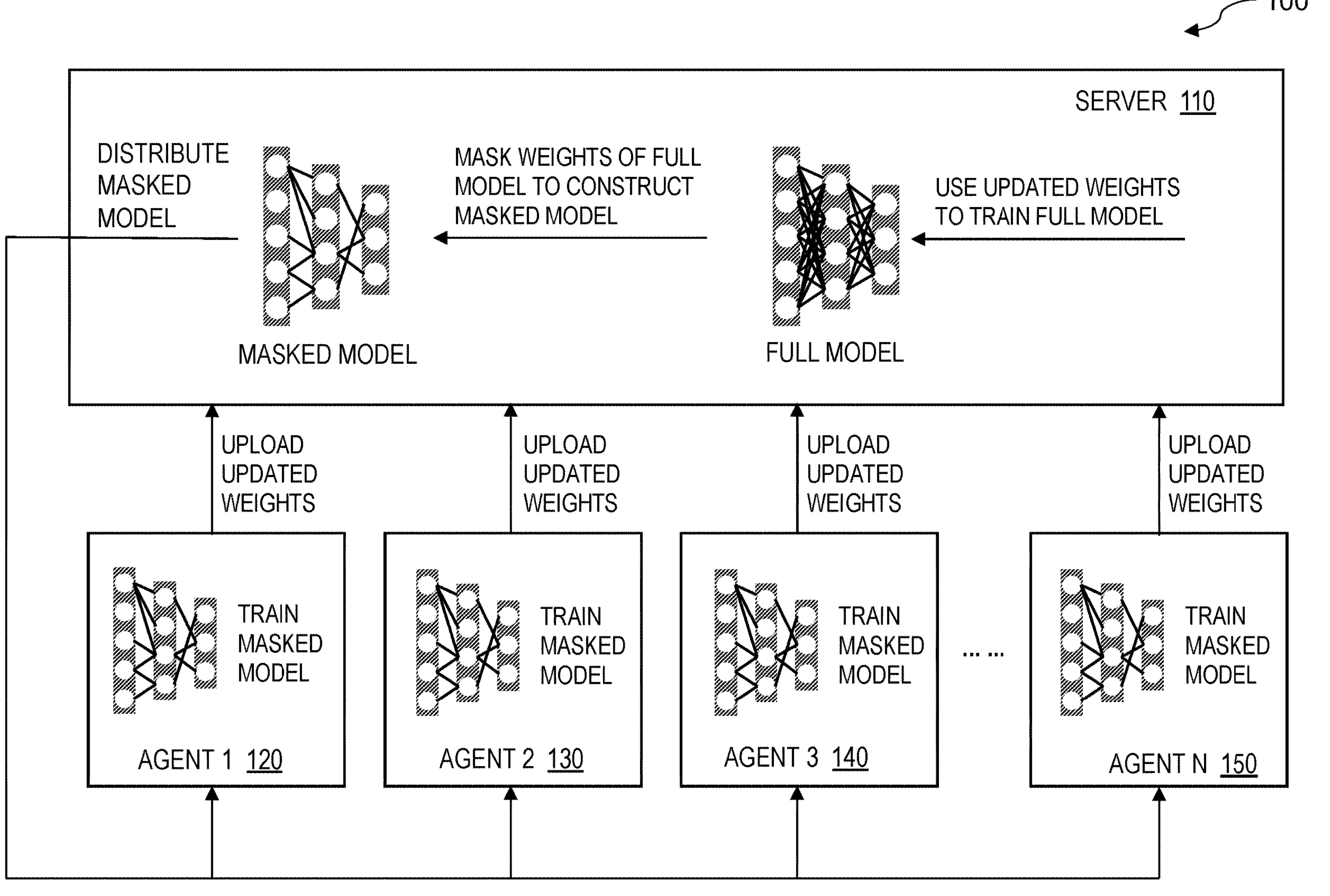
FIG. 1 is a systematic diagram illustrating a system of resource-limited federated learning using dynamic masking, in accordance with one embodiment of the present invention.

FIG. 1 is a systematic diagram illustrating system 100 of resource-limited federated learning using dynamic masking, in accordance with one embodiment of the present invention. System 100 includes server 110 in a federated learning setting. System 100 further includes N agents in the federated learning setting; as shown in FIG. 1, the N agents include agent 1 120, agent 2 130, agent 3 140, . . . , and agent N 150. In system 100, agent 1 120, agent 2 130, agent 3 140, . . . , and agent N 150 are resource-constrained agents. Each of agent 1 120, agent 2 130, agent 3 140, . . . , and agent N 150 owns its local training data. Server 110 aims to learn an accurate pruned model without accessing local training data on each of the agents.

Server 110 may reside on a computing device. N agents (agent 1 120, agent 2 130, agent 3 140, . . . , and agent N 150) may reside on respective ones of computing devices; for example, the agents may be edge and mobile devices. A computing device may be any electronic device or computing system capable of receiving input from a user, executing computer program instructions, and communicating with another computing system via a network. A computing device hosting server 110 or a respective one of agent 1 120, agent 2 130, agent 3 140, . . . , and agent N 150 is described in more detail in later paragraphs with reference to FIG. 3.

System 100 may be implemented in a network that can be any combination of connections and protocols which support communications between server 110 and N agents (agent 1 120, agent 2 130, agent 3 140, . . . , and agent N 150). For example, the network may be the Internet which represents a worldwide collection of networks and gateways to support communications between devices connected to the Internet; the network may be implemented as an intranet, a local area network (LAN), a wide area network (WAN), and a wireless network. System 100 may be implemented in a cloud environment. The cloud environment is described in later paragraphs with reference to FIG. 4 and FIG. 5.

Server 110 initially constructs a full machine learning model (e.g., a deep neural network) and initiates weights of the full machine learning model. The initialization of the weights may be in various forms, such as random initialization, variance scaling initialization, etc.

Server 110 evaluates resources (e.g., computing capacities and/or connectivity) of respective ones of agent 1 120, agent 2 130, agent 3 140, . . . , and agent N 150, and thus server 100 determines capacities of model training in federated machine learning by respective ones of agent 1 120, agent 2 130, agent 3 140, . . . , and agent N 150. Based on the capacity, server 100 masks the weights of the full machine learning model and constructs a masked machine learning model (or sparse machine learning model). Server 100 masks a predetermined number of smallest weights of the full machine learning model. The masked machine learning model is generated for agent 1 120, agent 2 130, agent 3 140, . . . , and agent N 150 which are resource-constrained agents. Resource constraints in the federated machine learning is considered by server 100, and masking weights of the full machine learning model is based on such resource constraints. By masking the full machine learning model and generating the masked machine learning model, server 110 reduces computation and communication cost for respective ones of agent 1 120, agent 2 130, agent 3 140, . . . , and agent N 150; at the same time, the overall efficiency and accuracy of the federated machine learning are guaranteed.

Server 110 distributes the masked machine learning model to respective ones of agent 1 120, agent 2 130, agent 3 140, . . . , and agent N 150. The respective ones of agent 1 120, agent 2 130, agent 3 140, . . . , and agent N 150 start a regular federated machine learning process. Each of agent 1 120, agent 2 130, agent 3 140, . . . , and agent N 150 uses its local training data or a subset of its local training data to train the masked machine learning model (or sparse machine learning model) to obtain updated weights of the masked machine learning model. Each of agent 1 120, agent 2 130, agent 3 140, . . . , and agent N 150 uploads the updated weights to server 110.

Upon receiving the updated weights, server 110 updates the full machine learning model based on the updated weights. Upon updating the full machine learning model, server 110 determines whether the updated full machine learning model converges. If the updated full machine learning model converges, server 110 completes the federated machine learning. If the updated full machine learning model does not converge, server 100 will iterate the federated learning using dynamic masking. Under the condition where the resources of respective ones of agent 1 120, agent 2 130, agent 3 140, . . . , and agent N 150 have changed, server 110 re-evaluates the capacities of model training in federated machine learning, masks the updated full machine learning model, generates a new masked machine learning model, and distributes the new masked machine learning model to agent 1 120, agent 2 130, agent 3 140, . . . , and agent N 150 for another cycle of model training. Under the condition where the resources of respective ones of agent 1 120, agent 2 130, agent 3 140, . . . , and agent N 150 have not changed, server 110 masks the updated full machine learning model, generates a new masked machine learning model and distributes the new masked machine learning model to agent 1 120, agent 2 130, agent 3 140, . . . , and agent N 150 for another cycle of model training. Masking weights of the full machine learning model to generate the masked machine learning model is dynamic; in other words, resource-limited federated learning is performed by dynamically masking weights of the full machine learning model or the updated full machine learning in iterations.

Figure 2:
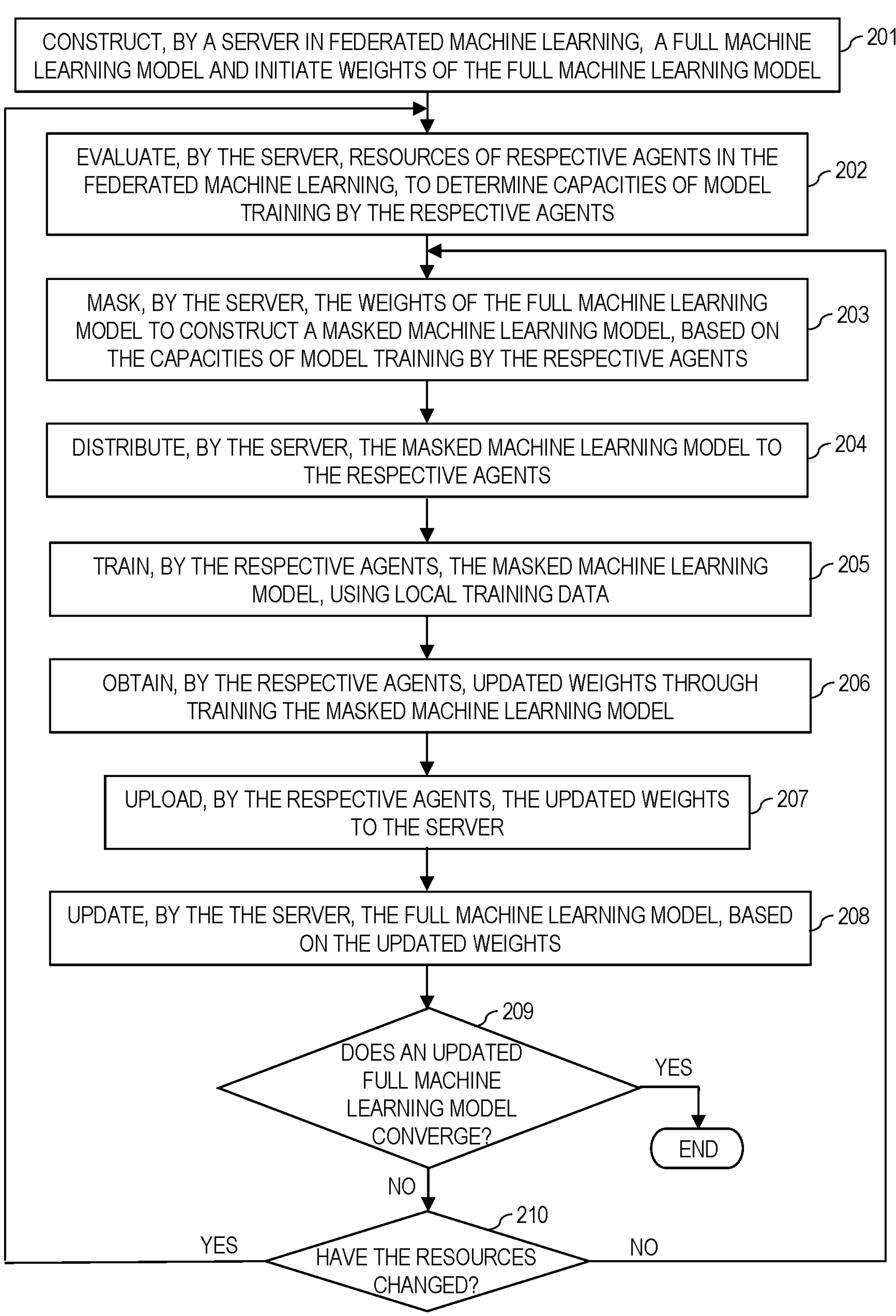
FIG. 2 is a flowchart showing operational steps for resource-limited federated learning using dynamic masking, in accordance with one embodiment of the present invention.

FIG. 2 is a flowchart showing operational steps for resource-limited federated learning using dynamic masking, in accordance with one embodiment of the present invention. At step 201, a server (such as server 110 shown FIG. 1) in federated machine learning constructs a full machine learning model and initiate weights of the full machine learning model.

At step 202, the server evaluates resources of respective agents in the federated machine learning, to determine capacities of model training by the respective agents (such as agent 1 120, agent 2 130, agent 3 140, . . . , and agent N 150 shown FIG. 1). The respective agents are resource-constrained agents in the federated machine learning. The capacities of model training are controlling factors in the source-limited federated machine learning.

At step 203, the server masks the weights of the full machine learning model to construct a masked machine learning model, based on the capacities of model training by the respective agents. The server masks a predetermined number of smallest weights of the full machine learning model which is constructed at step 201. At step 203, the server generates the masked machine learning model for resource-constrained agents. The computation and communication cost for respective agents is reduced by using the masked machine learning model in the federated machine learning, while the overall efficiency and accuracy of the federated machine learning are maintained.

At step 204, the server distributes the masked machine learning model to the respective agents. The masked machine learning model is sent to the respective agents for training using local training data on the respective agents. The masked machine learning model is distributed to the respective agents through a network that can be any combination of connections and protocols which support communications between the server and the respective agents.

At step 205, the respective agents train the masked machine learning model, using local training data. Upon receiving the masked machine learning model from the server, the respect agents start a regular federated machine learning process. Each of the agents uses its local training data or a subset of its local training data to train the masked machine learning model (or sparse machine learning model). However, each agent does not share its local data with the server. Therefore, high accuracy of training the masked machine learning model is maintained, and, at the same time, the privacy of local data of each agent can be protected.

At step 206, the respective agents obtain updated weights through training the masked machine learning model. At step 207, the respective agents upload the updated weights to the server. While the respective agents upload the upgraded weights to the server, the respective agents do not share the local data with the server, thus protecting the privacy of local data of the respective agents. The updated weights is uploaded to the server through a network that can be any combination of connections and protocols which support communications between the server and the respective agents.

At step 208, the server updates the full machine learning model, based on the updated weights uploaded by the respective agents. Upon receiving the updated weights of the masked machine learning model, the server updates the full machine learning model and generates an updated full machine learning model.

At step 209, the server determines whether the updated full machine learning model converges. In response to determining that the updated full machine learning model converges (YES branch of decision block 209), the server completes resource-limited federated learning using dynamic masking. In response to determining that the updated full machine learning model does not converge (NO branch of decision block 209), the server at step 210 determines whether the resources of the respective agents have changed.

In response to determining that the resources of the respective agents have changed (YES branch of decision block 210), the server iterates step 202 to re-evaluate the resources of the respective agents and determine new capacities of model training by the respective agents. Then, in a current iteration, the server iterates steps 203-209: the server masks the updated weights of the updated full machine learning model to construct a new masked machine learning model, the server distributes the new masked machine learning model to the respective agents, the respective agents train the new masked machine learning model, the respective agents obtain new updated weights and upload them to the server, the server updates the full machine learning model that is updated in a previous iteration, and the server determines whether the full machine learning model that is updated in the current iteration converges. If the full machine learning model that is updated in the current iteration converges, the server completes iteration. In response to determining that the resources of the respective agents have not changed (NO branch of decision block 210), the server iterates steps 203-209 without re-evaluating the resources.

Figure 3:
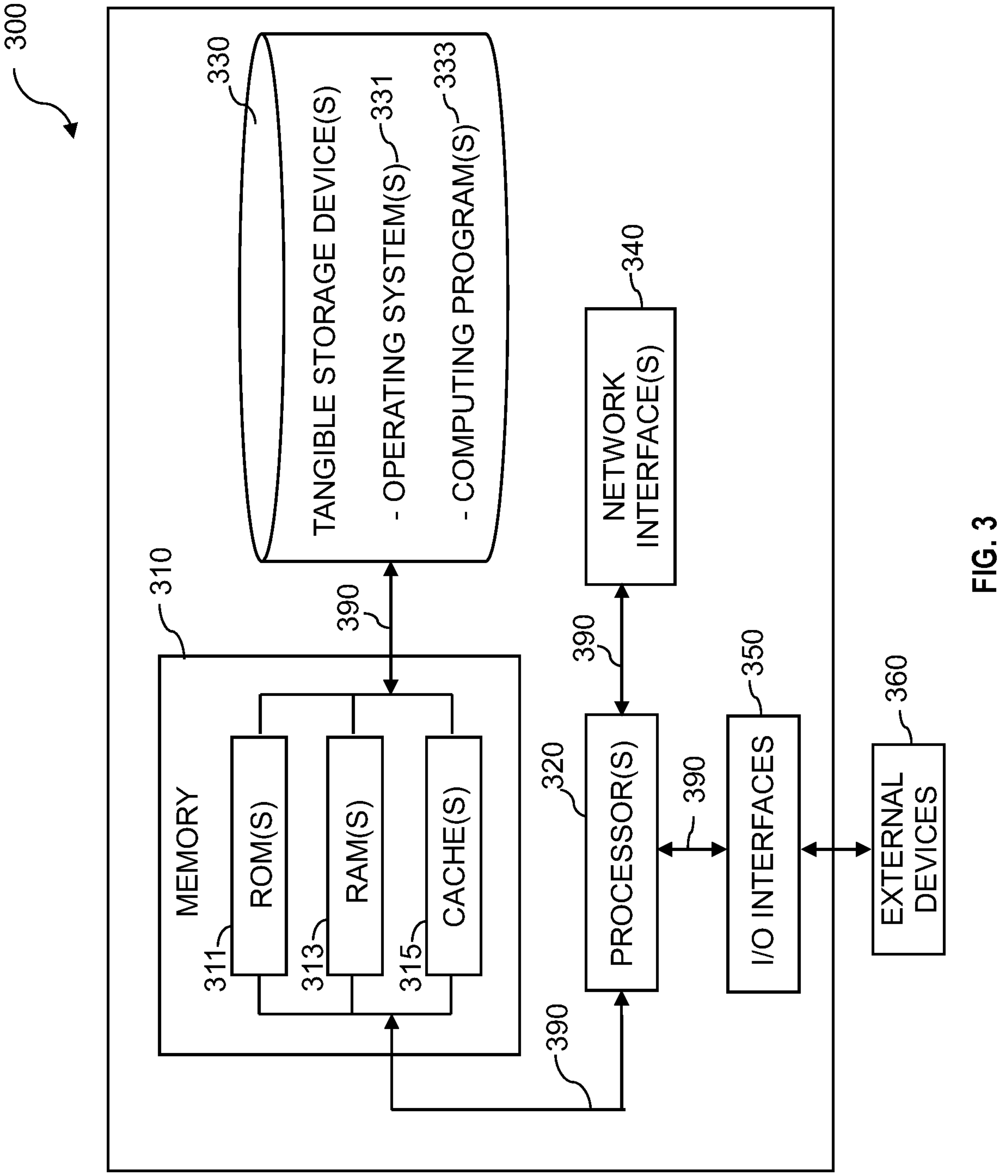
FIG. 3 is a diagram illustrating components of a computing device or server, in accordance with one embodiment of the present invention.

FIG. 3 is a diagram illustrating components of computing device or server 300, in accordance with one embodiment of the present invention. It should be appreciated that FIG. 3 provides only an illustration of one implementation and does not imply any limitations; different embodiments may be implemented.

Referring to FIG. 3, computing device or server 300 includes processor(s) 320, memory 310, and tangible storage device(s) 330. In FIG. 3, communications among the above-mentioned components of computing device or server 300 are denoted by numeral 390. Memory 310 includes ROM(s) (Read Only Memory) 311, RAM(s) (Random Access Memory) 313, and cache(s) 315. One or more operating systems 331 and one or more computer programs 333 reside on one or more computer readable tangible storage device(s) 330.

Computing device or server 300 further includes I/O interface(s) 350. I/O interface(s) 350 allows for input and output of data with external device(s) 360 that may be connected to computing device or server 300. Computing device or server 300 further includes network interface(s) 340 for communications between computing device or server 300 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
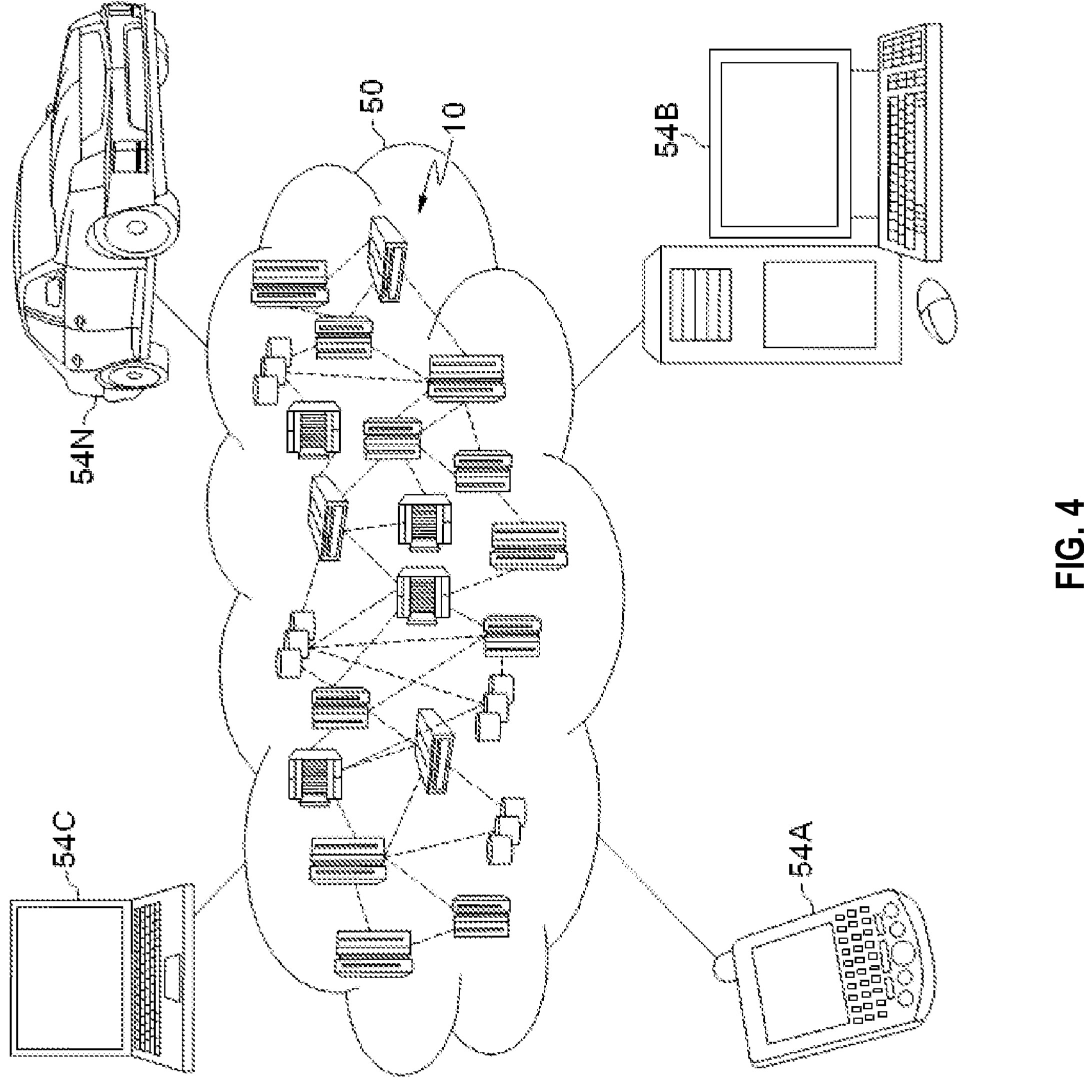
FIG. 4 depicts a cloud computing environment, in accordance with one embodiment of the present invention.

Referring now to FIG. 4, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 5:
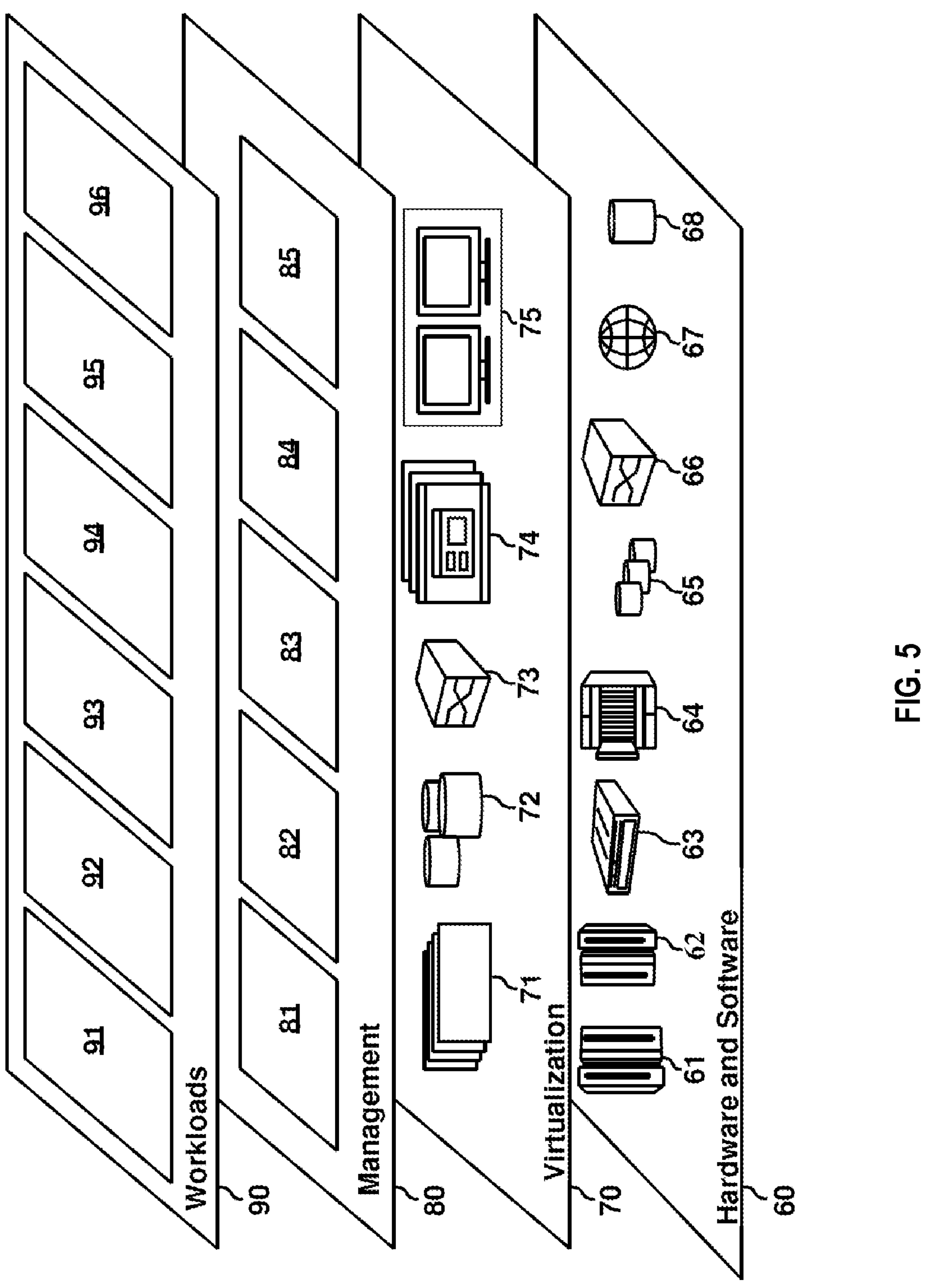
FIG. 5 depicts abstraction model layers in a cloud environment, in accordance with one embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is functionality of resource-limited federated learning using dynamic masking.

What is claimed is:

1. A computer-implemented method for resource-limited federated learning using dynamic masking, the method comprising:

evaluating, by a server in federated machine learning, resources of respective agents in the federated machine learning to determine capacities of model training by the respective agents;

masking, by the server, weights of a full machine learning model to construct a masked machine learning model, based on the capacities, wherein a binary mask is generated having a same size and shape of the full machine learning model;

distributing, by the server, the masked machine learning model to the respective agents which train the masked machine learning model;

training, by the respective agents, the masked machine learning model, using local training data, wherein the training of the masked machine learning model is performed on one or more computing devices corresponding to the respective agents, wherein the local training data is inaccessible by the server;

receiving, by the server, from the respective agents, updated weights obtained through the training of the masked machine learning model;

updating, by the server, the full machine learning model, based on the updated weights;

determining, by the server, whether an updated full machine learning model converges; and in response to determining that the updated full machine learning model converges, determining, by the server, whether the resources have changed.

2. The computer-implemented method of claim 1, further comprising:

in response to determining that the resources have changed, re-evaluating, by the server, the resources to determine new capacities of the model training by the respective agents;

masking, by the server, weights of the updated full machine learning model to construct a new masked machine learning model, based on the new capacities, in a current iteration;

distributing, by the server, the new masked machine learning model to the respective agents, for training the new masked machine learning model and obtaining new updated weights; and updating, by the server, a full machine learning model that has been updated in a previous iteration, based on the new updated weights.

3. The computer-implemented method of claim 1, further comprising:

in response to determining that the resources have not changed, masking, by the server, weights of the updated full machine learning model to construct a new masked machine learning model, based on the capacities, in a current iteration;

distributing, by the server, the new masked machine learning model to the respective agents, for training the new masked machine learning model and obtaining new updated weights; and updating, by the server, a full machine learning model that has been updated in a previous iteration, based on the new updated weights.

4. The computer-implemented method of claim 1, further comprising:

constructing, by the server, the full machine learning model; and initiating, by the server, the weights of the full machine learning model.

5. The computer-implemented method of claim 1, wherein the training of the masked machine learning model further comprises:

obtaining, by the respective agents, the updated weights; and uploading, by the respective agents, the updated weights to the server.

6. The computer-implemented method of claim 1, wherein the full machine learning model is a deep neural network, and wherein the weights of the full machine learning model are initialized by random initialization or variance scaling initialization.

7. The computer-implemented method of claim 1, wherein masking the weights of the full machine learning model to construct the masked machine learning model further comprises:

masking a predetermined number of smallest weights of the full machine learning model, wherein the predetermined number of the smallest weights is determined based on resource constraints of the respect agents in the federated machine learning.

8. The computer-implemented method of claim 1, wherein the respective agents each reside on an edge device, wherein the server is a fusion server, wherein distributing the masked machine learning model to the respective agents reduces a computation and communication cost for each of the respective agents, and wherein in response to determining that the updated full machine learning model converges, further comprises:

completing resource-limited federated learning using dynamic masking.

9. A computer program product for resource-limited federated learning using dynamic masking, the computer program product comprising a computer readable storage medium having program instructions embodied therewith, the program instructions executable by one or more processors, the program instructions executable to:

evaluate, by a server in federated machine learning, resources of respective agents in the federated machine learning to determine capacities of model training by the respective agents;

mask, by the server, weights of a full machine learning model to construct a masked machine learning model, based on the capacities, wherein a binary mask is generated having a same size and shape of the full machine learning model;

distribute, by the server, the masked machine learning model to the respective agents which train the masked machine learning model;

train, by the respective agents, the masked machine learning model, using local training data, wherein the training of the masked machine learning model is performed on one or more computing devices corresponding to the respective agents, wherein the local training data is inaccessible by the server;

receive, by the server, from the respective agents, updated weights obtained through the training of the masked machine learning model;

update, by the server, the full machine learning model, based on the updated weights;

determine, by the server, whether an updated full machine learning model converges; and in response to determining that the updated full machine learning model converges, determine, by the server, whether the resources have changed.

10. The computer program product of claim 9, further comprising the program instructions executable to:

in response to determining that the resources have changed, re-evaluate, by the server, the resources to determine new capacities of the model training by the respective agents;

mask, by the server, weights of the updated full machine learning model to construct a new masked machine learning model, based on the new capacities, in a current iteration;

distribute, by the server, the new masked machine learning model to the respective agents, for training the new masked machine learning model and obtaining new updated weights; and update, by the server, a full machine learning model that has been updated in a previous iteration, based on the new updated weights.

11. The computer program product of claim 9, further comprising the program instructions executable to:

in response to determining that the resources have not changed, mask, by the server, weights of the updated full machine learning model to construct a new masked machine learning model, based on the capacities, in a current iteration;

distribute, by the server, the new masked machine learning model to the respective agents, for training the new masked machine learning model and obtaining new updated weights; and update, by the server, a full machine learning model that has been updated in a previous iteration, based on the new updated weights.

12. The computer program product of claim 9, further comprising the program instructions executable to:

construct, by the server, the full machine learning model; and initiate, by the server, the weights of the full machine learning model.

13. The computer program product of claim 9, the training of the masked machine learning model further comprises program instructions executable to:

obtain, by the respective agents, the updated weights; and upload, by the respective agents, the updated weights to the server.

14. A computer system for resource-limited federated learning using dynamic masking, the computer system comprising one or more processors, one or more computer readable tangible storage devices, and program instructions stored on at least one of the one or more computer readable tangible storage devices for execution by at least one of the one or more processors, the program instructions executable to:

evaluate, by a server in federated machine learning, resources of respective agents in the federated machine learning to determine capacities of model training by the respective agents;

mask, by the server, weights of a full machine learning model to construct a masked machine learning model, based on the capacities, wherein a binary mask is generated having a same size and shape of the full machine learning model;

distribute, by the server, the masked machine learning model to the respective agents which train the masked machine learning model;

train, by the respective agents, the masked machine learning model, using local training data, wherein the training of the masked machine learning model is performed on one or more computing devices corresponding to the respective agents, wherein the local training data is inaccessible by the server;

receive, by the server, from the respective agents, updated weights obtained through the training of the masked machine learning model;

update, by the server, the full machine learning model, based on the updated weights;

determine, by the server, whether an updated full machine learning model converges; and in response to determining that the updated full machine learning model converges, determine, by the server, whether the resources have changed.

15. The computer system of claim 14, further comprising the program instructions executable to:

in response to determining that the resources have changed, re-evaluate, by the server, the resources to determine new capacities of the model training by the respective agents;

mask, by the server, weights of the updated full machine learning model to construct a new masked machine learning model, based on the new capacities, in a current iteration;

distribute, by the server, the new masked machine learning model to the respective agents, for training the new masked machine learning model and obtaining new updated weights; and update, by the server, a full machine learning model that has been updated in a previous iteration, based on the new updated weights.

16. The computer system of claim 14, further comprising the program instructions executable to:

in response to determining that the resources have not changed, mask, by the server, weights of the updated full machine learning model to construct a new masked machine learning model, based on the capacities, in a current iteration;

distribute, by the server, the new masked machine learning model to the respective agents, for training the new masked machine learning model and obtaining new updated weights; and update, by the server, a full machine learning model that has been updated in a previous iteration, based on the new updated weights.

17. The computer system of claim 14, further comprising the program instructions executable to:

construct, by the server, the full machine learning model; and initiate, by the server, the weights of the full machine learning model.

18. The computer system of claim 14, wherein the training of the masked machine learning model further comprises program instructions executable to:

obtain, by the respective agents, the updated weights; and upload, by the respective agents, the updated weights to the server.

* * * * *